United States Patent [19]
Kaufman

[11] 3,762,441
[45] Oct. 2, 1973

[54] JET COUPLED FOUR-WAY VALVE

[75] Inventor: Warren F. Kaufman, Santa Ana, Calif.

[73] Assignee: Philco-Ford Corporation, Philadelphia, Pa.

[22] Filed: Aug. 20, 1971

[21] Appl. No.: 173,477

[52] U.S. Cl............ 137/597, 137/625.2, 137/625.25, 137/625.65
[51] Int. Cl............................................. F16k 11/00
[58] Field of Search.............. 137/83, 625.65, 625.2, 137/625.25, 597, 81.5, 625.68

[56] References Cited
UNITED STATES PATENTS

| | | | |
|---|---|---|---|
| 2,870,787 | 1/1959 | Rossi | 137/597 |
| 3,311,130 | 3/1967 | Caldwell | 137/597 X |
| 3,521,654 | 7/1970 | Bravtaset et al. | 137/81.5 |
| 3,529,616 | 9/1970 | Davis | 137/81.5 |

*Primary Examiner*—Henry T. Klinksiek
*Assistant Examiner*—Robert J. Miller
*Attorney*—Robert D. Sanborn

[57] ABSTRACT

A pneumatic switching valve comprising a flexure-mounted armature, or "flapper", which is cycled under solenoid control, against a pair of orifices each of which controls a gas outlet port leading to a mechanical actuator. The flapper moves in a plane transverse the path of fluid supplied by two, confronting, supersonic jets, and passages in the flapper permit jet-derived fluid to flow toward one or the other of the actuators depending upon the position of the flapper with respect to the exit ports, as determined by the solenoids. A gap is provided between the flapper passages and the jet inlet nozzles, and serves as a bleed port affording automatic pressure relief.

12 Claims, 9 Drawing Figures

INVENTOR
WARREN F. KAUFMAN

INVENTOR
WARREN F. KAUFMAN
BY
Carl H. Lynnestvedt
AGENT

INVENTOR
WARREN F. KAUFMAN
BY
*Carl H. Synnestvedt*
AGENT

3,762,441

JET COUPLED FOUR-WAY VALVE

BACKGROUND OF THE INVENTION

Valves adapted for use in control of fluid flow to guide aerospace vehicles, for example guided missles, must operate with extremely high precision and reliability. Valves of the type commonly known as flapper valves frequently have been used in this field, to control the relative rates of fluid flow from a hot gas generator through a pair of outlet ports leading to guidance actuators. Such apparatus preferably includes solenoid means for cycling the flapper in accordance with predetermined control signals, whereby to control the period during which the flapper dwells on each outlet port.

While advantageous, such apparatus is subject to limitations and difficulties arising from the fact that the gas generators utilized in missiles, and the like, operate at high temperatures and pressures and are difficult to modulate and control. Accordingly, substantial increases in pressure may result and such increases can cause damage to both the generator and the control system actuators.

SUMMARY OF THE INVENTION

These difficulties can be avoided by providing automatic pressure relief in the system, and I have achieved this in very simple manner by utilizing flueric elements including supersonic gas inlet nozzle means and movable, ducted, valve means, the elements being so proportioned and disposed as to afford pressure relief. In this apparatus the total flow from the supersonic inlet jets can be deflected through flapper-carried passages to a pair of opposed actuators which provide missile guidance. The flueric relief action inherent in this apparatus maintains a high percentage of the normal fluid flow rate into the actuators, while protecting the actuators and the generator against damage should the pressure increase substantially.

With the foregoing in mind it is the jet object of my invention to provide substantially frictionless et valve equipment which will operate in the achievement of missile guidance at very high temperatures and pressures, will withstand vibrations and rapid acceleration without malfunction, which can be pulse-modulated in the extremely rapid fashion required to afford discrete and controllable valve actuation, and which has such inherent pressure relief as is required.

It is a feature of the invention that the novel arrangement for coupling the inlet jets with the flapper-carried fluid passages eliminates the need for the cavity of the valve body to serve as a pressure vessel. The excess gas, under over-pressure conditions, is exhausted at essentially atmospheric pressure.

To these ends I use a flapper or jet coupler which has separate and individual fluid passages therethrough. Certain passages are provided with inlets to confront the nozzles through which the gas is delivered from the generator, and also serve as diffusers downstream of the inlet jet. Individual flapper passages have outlets adapted to couple the flapper with a corresponding one of the outlet ports and ducts leading to the actuators. Which actuator is fed is determined by the flapper position as established by solenoids which translate the flapper toward its terminal positions, where a seal is created between its passages and the outlet ports in each terminal position. Conveniently, the actuators comprise a pair of sylphon bellows assemblies coupled to provide mechanical movement, for example swinging of a lever, which movement may be used to guide the vehicle or missile.

Under the initial phase of operation, when the actuators are not pressurized, the latter will take the full flow from the inlet nozzles. As the pressure builds up in the actuators, a shock wave set up by the supersonic flow moves back toward each inlet nozzle. When the shock waves reach a position just downstream of the throats of the inlet nozzles, supersonic flow breaks down across the gap region and leakage from the valve cavity results. The leakage increases as the pressure in the actuators develops toward a predetermined maximum.

BRIEF DESCRIPTION OF THE DRAWINGS

In the accompanying drawings.

DESCRIPTION OF THE PREFERRED EMBODIMENT

Figure 1:
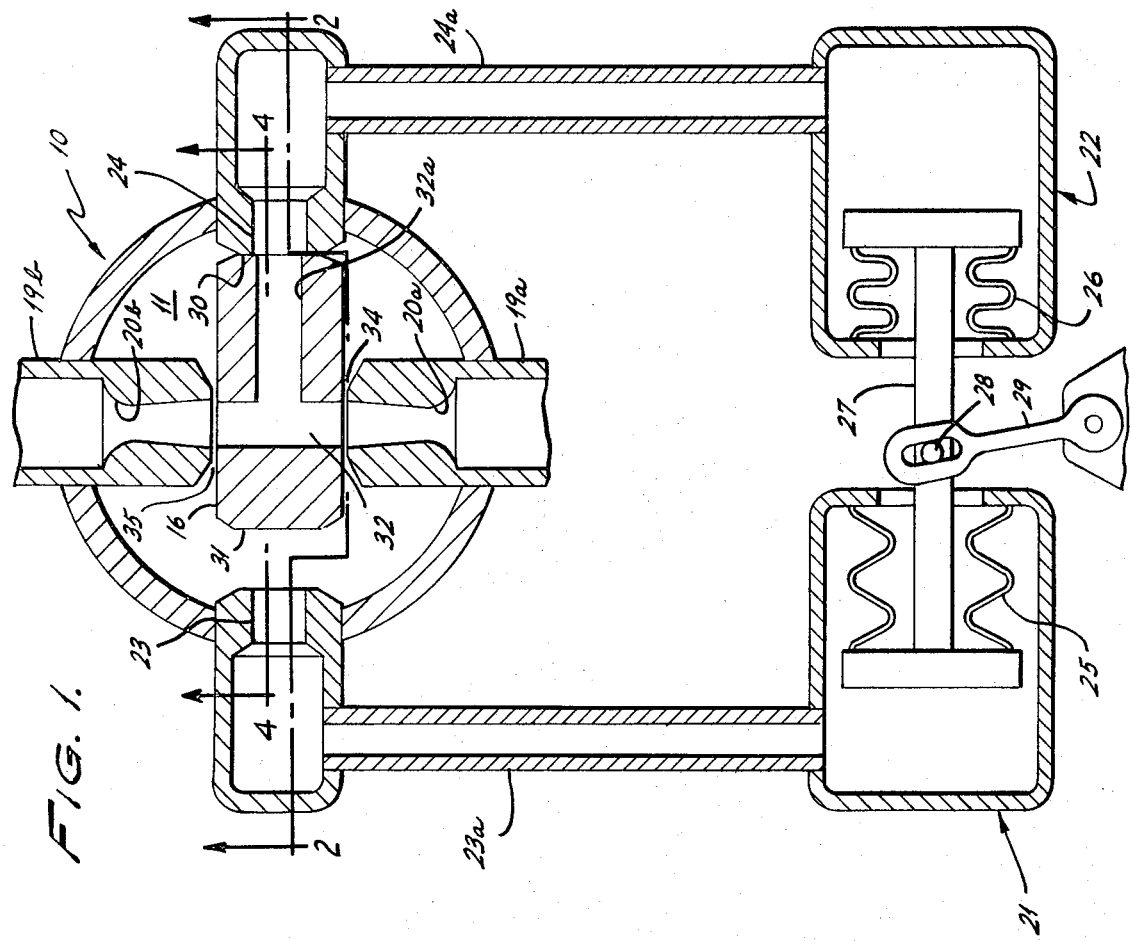
FIG. 1 is a somewhat schematic, sectional view showing jet-coupled flapper valve apparatus on a considerably enlarged scale and in association with a pair of bellows-type actuators.
Figure 2:
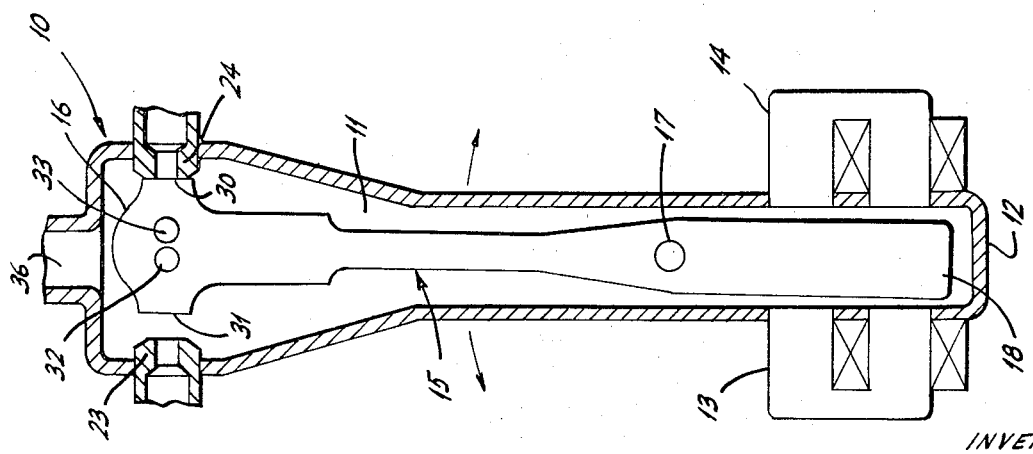
FIG. 2 is a partially sectional, partially elevational view illustrating the ducted flapper element of my invention, the view being taken along the line 2—2 applied to FIG. 1 and being on a smaller scale.

Making initial reference to FIGS. 1 and 2 it will be seen that the valve apparatus of this invention is enclosed within a housing 10 which has a substantially tubular cavity 11 extending downwardly (as viewed in FIG. 2) from the valve structure and terminating in a closed end portion 12 which supports a pair of individual electromagnets 13 and 14 each adapted to be energized in accordance with electrical pulse signals, by means not shown. Energization of the magnets controls the movements of a flapper 15 having a ducted head portion 16, an intermediate pivot 17, and a lower extending portion 18. Fluid is inletted to the cavity 11 through a pair of inlet ports 19a and 19b which terminate in venturi nozzles 20a and 20b through which fluid derived from a gas generator (not shown) is inletted and flows at supersonic velocity toward and through the ducted head portion 16 of the flapper. The flapper, by virtue of its pivotal mounting at 17, is free to move in a plane transverse the path of fluid supplied by the two opposed venturi nozzles 20a and 20b and the head of the flapper is provided with ducts or passages through which the jet-derived fluid flows toward one or the other of two actuators 21 and 22. By virtue of the pivotal mounting of the illustrated flapper 15 at a point intermediate its ends, and near its center of mass, the flapper is inertia compensated.

Flow toward the actuators is controlled in accordance with the position of head 16 of flapper 15 with respect to a pair of outlet ports 23 and 24 which, respectively, lead to ducts 23a and 24a each terminating at one of the actuators 21 and 22. Conveniently, and as shown, the actuators are of known type incorporating a sylphon-bellows. Such a bellows is shown at 25 in actuator 21, and at 26 in actuator 22, the pair of bellows being interconnected by a horizontally shiftable cross rod 27 which is pinned, at 28, to apparatus for providing mechanical movement useful in guiding a vehicle or missile. Conveniently this apparatus can take the form of a pivoted lever 29.

The present invention is not concerned with the details of the missile guidance apparatus per se, and detailed description of such apparatus is not required beyond an indication that it may for example comprise a fin (not shown) actuated by lever 29. It will also be understood that a complete missile system would include apparatus for controlling the solenoids 13 and 14 in such manner as to cycle the flapper in accordance with predetermined control signals and thereby control the period during which the discharge faces 30 and 31 of the flapper head 16 dwell on each outlet port 24 and 23. Rapid, sequential energization and deenergization of solenoids 13 and 14 is programmed by such signals, in known manner, to achieve pulsed modulation of the flow of control gas toward the actuators 21 and 22. Pulse duration control may, if desired, be accomplished in the general manner disclosed in Carver U.S. Pat. No. 3,215,162, issued Nov. 2, 1965, and assigned to Ford Motor Company.

Figure 5:
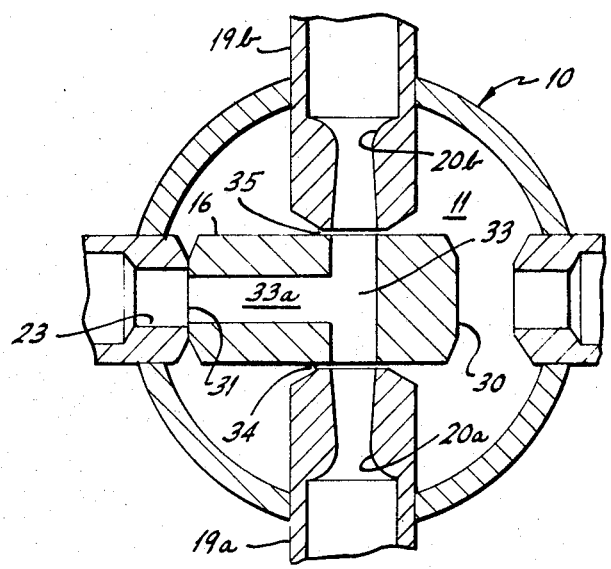
FIG. 5 is a fragmentary, schematic, sectional view similar to portions of FIG. 1, showing the ducted flapper as confronting the left-hand outlet port, the section being taken at a level such as to illustrate the manner in which another flapper-carried passage is used in feeding of fluid to said left-hand port.
Figure 4:
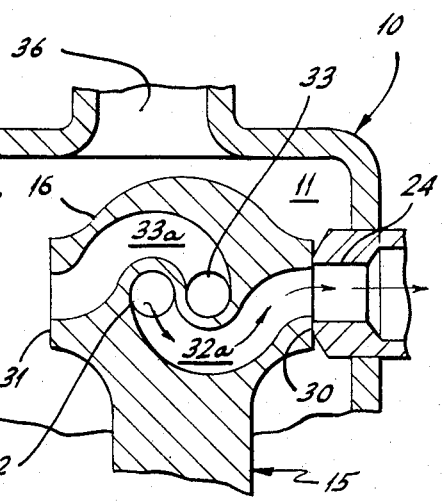
FIG. 4 is a fragmentary, sectional view through the ducted flapper, looking in the direction of arrows 4—4 applied to FIG. 1, and showing the manner in which the flapper passages may be coupled to the right-hand outlet port.
Figure 6:
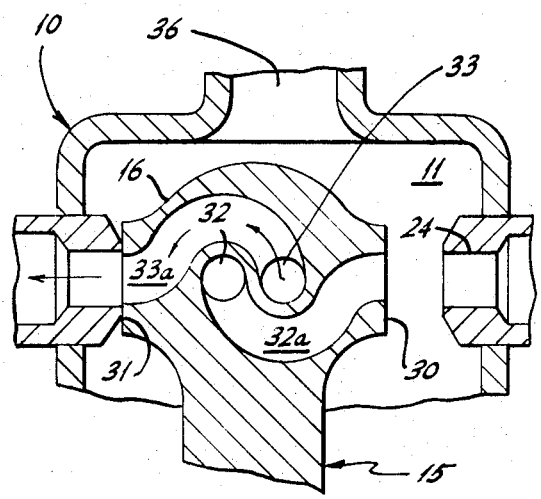
FIG. 6 is a view smilar to FIG. 4 and illustrates the condition which obtains when the flapper is disposed to feed the left-hand outlet port.

Considering the ducted flapper in greater detail, and with additional reference to FIGS. 4-6, it will be seen that the flapper head 16 has a pair of separate and individual cross passages 32 and 33 extending therethrough in the general direction of the inlet nozzles 20a and 20b. As appears to best advantage in FIGS. 4 to 6 each of the cross passages 32 and 33 is connected to a passage which terminates in one of the opposed discharge faces of the flapper and is curved to clear other passage structure. As seen in FIGS. 1 and 4, the cross passage 32 connects with a curved duct 32a which terminates in the face 30, and the cross passage 33 (FIGS. 5 and 6) is connected to a curved duct 33a which terminates in the face 31. Each cross passage serves also as a jet diffuser portion within which pressure reduction takes place, as will be referred to later in the description. When the flapper has been translated to the right (FIG. 1), that is when it occupies the position in which its face 30 is sealed against the outlet port 24, fluid is fed from the inlet nozzles 20a and 20b across small gaps 34 and 35, and into the diffuser portions of cross passage 32. Under this condition, and as appears to best advantage by comparing FIGS. 1 and 4, the fluid inletted by the venturi jets and entering the diffuser 32 is ducted to passage 32a, thence exiting from the face 30 of the flapper and into the outlet port 24, for flow through duct 24a and into actuator 22. Similarly, when the flapper has been translated to its left-hand position, as appears in FIGS. 5 and 6, the gas inletted through the venturi jets 20a and 20b is delivered to the confronting cross duct 33, and thence to the curved diffuser passage 33a which communicates with flapper face 31, which latter is, in said left-hand position, sealed against left-hand exit port 23 leading to actuator 21. Thus, under control of the solenoids 13 and 14, the hot high pressure gas flows from the inlet jet nozzles 20a and 20b and into the actuators 21 and 22, in accordance with the modulation imposed on the flapper, that is, in accordance with the periods of flapper dwell. When the flapper occupies the position shown in FIGS. 1 and 4, pressure builds up in the right-hand actuator 22 driving its piston-bellows 26 to the left causing the lever 29 to rotate in a counterclockwise direction and produce corresponding movement of the control surface (not shown). During this energization of actuator 22, the left-hand piston-bellows 25 is forcing gas from the left-hand actuator 21 to flow back through the port 23 and into the valve body 10. This gas flows outwardly of the body through an exit duct 36 (FIGS. 2, 4 and 6). For reasons which will become clearer as the description proceeds, the area of exit vent duct 36 is several times the area of the inlet ducts associated with nozzles 20a and 20b. Typically the vent duct has an area about three times the inlet area.

It should be understood that pulse duration control, as applied to flapper valves, also permits the opposed actuators to be held in an intermediate position between the extreme positions of the actuators. This will be understood from the fact that if the rate of pulse duration control exceeds the inertial response time of the actuators a "steady" condition results in which the valve maintains the actuators in an intermediate position.

Figure 3:
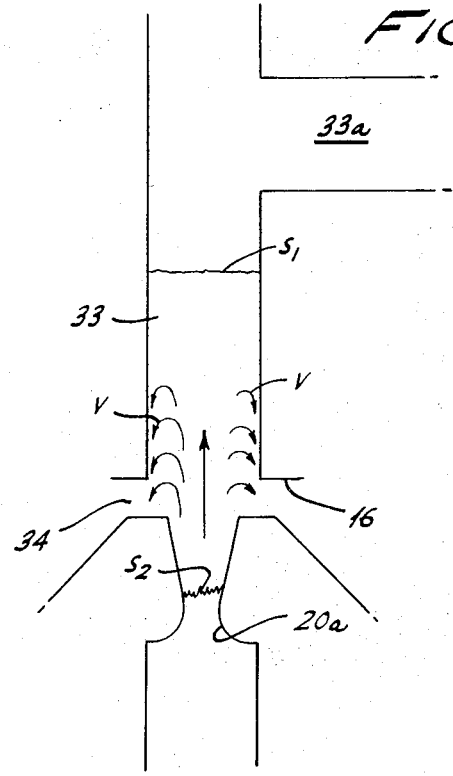
FIG. 3 is a partial schematic showing of one jet inlet nozzle and cooperating passage portions of the flapper, these elements being shown on a substantially enlarged and somewhat distorted scale to facilitate illustration of the pressure relief afforded under certain conditions of operation.

The invention particularly is featured by the fact that the system is so designed as to provide automatic pressure relief, and for this purpose, the valve structure includes accurately designed bleed gaps between the sides of the flapper and each inlet nozzle. When operation of the system is initiated, a solid propellant generator (not shown) is ignited which generator is connected to both of the inlet nozzles. Hot, high pressure gas is therefore directed through the nozzles and flows toward the actuators in accordance with the positions of the flapper. These bleed gaps are shown in the drawing at 34 and 35, and will be best understood by reference to FIG. 3 which shows the bleed gap 34. In this figure the gap, for exemplary purposes, is shown on a considerably enlarged scale. Assuming the gas flow as initially taking place into the cross-diffuser passage 33 and thence through 33a into right-hand actuator 22, it will be understood that there is an almost instantaneous increase in pressure in that actuator which is taking the full flow from the inlet nozzles during this initial phase of operation. As the pressure within the actuator increases, a shock wave, which initially occupies a region about as shown at $S_1$ in FIG. 3, moves back through the diffuser portion of right-hand cross duct 33 toward the throat of inlet nozzle 20a. In actual operation gas from the generator is accelerated to supersonic velocity at the nozzle 20a and is then expanded, reaching a maximum in the diffuser portion of passage 33, which is the pressure recovery element of the system. As the pressure in the actuator 22 approaches the design total pressure recovery of the supersonic diffuser, any slight increase in pressure above the design level drives the shock wave established in the region $S_1$, toward a region $S_2$ just downstream of the nozzle 20a. As the supersonic flow breaks down, the leakage through the gap 34 increases, as indicated by the curved arrows V, thereby affording automatic pressure relief through the exhaust vent 36. As mentioned above this pressure relief prevents damage in the generator and the control system actuators.

After an actuator has reached maximum design pressure, and as long as the flapper dwells on the outlet port, all of the flow must, of course, escape through the annular gaps to prevent damage to the system. Hence the existence and dimensions of such gaps are of importance. In one system which has yielded very good results, the diameter of each inlet nozzle throat was equal to 0.0368 inch, the outlet ports each has a minimum diameter of 0.085 inch, the cross ducts 32 and 33 each had a diameter of 0.063 inch, the flapper-carried outlet passages were 0.093 inch in diameter, and each of the gaps 34 and 35 were equal to 0.0087 inch. With provision of adequate venting from casing 10, and given the dimensions noted just above, it was found that, with the flapper maintained in one hardover position, there was no objectionable increase in pressure in either the generator or the actuator reservoir. The generator supply discharge pressure was 1,000 psig. The total flapper stroke was 0.074 inch, and the temperature of gas flowing from a generator of the kind useful in such a system may reach 4,000° F., or above.

Figure 7:
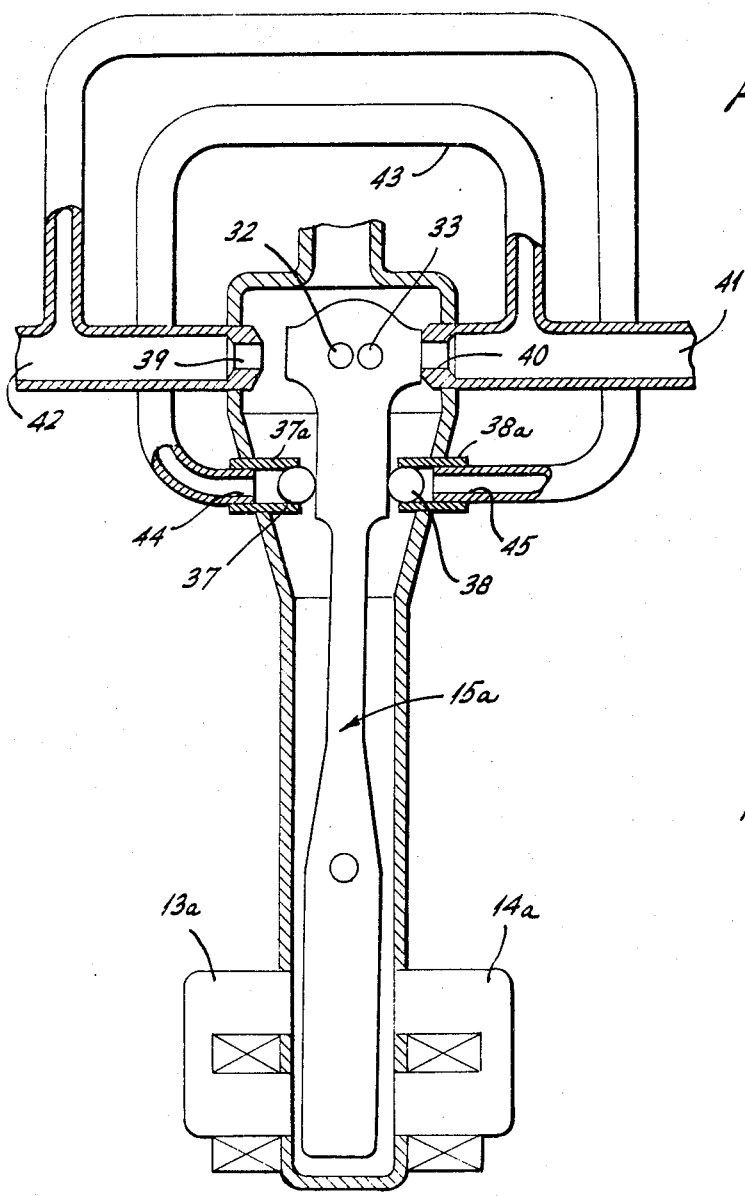
FIG. 7 is a view similar to FIG. 2, and illustrates a modified form of the invention in which a self-energizing effect is achieved.

In FIG. 7, there is illustrated an embodiment which is, as it were, self-energizing in that it requires that a minimum of energy be supplied to the solenoids to operate and maintain the flapper in desired positions. The flapper, shown at 15a in this Figure, and the solenoids which appear at 13a and 14a, can be identical to the corresponding elements already described with respect to the preceding figures. This is also the case with regard to the flapper-carried cross passages 32–33, and the inlet nozzle structure (not shown) all of which is identical to that appearing in the form shown in FIG. 1 and which passages and structure should be understood, without further description, as operating in the manner described with respect to the first embodiment. Similarly it should be understood that pressure relief would be provided in the arrangement of FIG. 7, as it is in the apparatus described above.

The apparatus of FIG. 7 has, however, significant advantages for certain applications in that, for a given gas pressure, a minimum of electromagnetic force is required because of the self-energizing effect mentioned above. A pair of force-balancing pistons, which may conveniently take the form of the ball elements shown at both 37 and 38, are mounted within collars 37a and 38a with freedom to follow the confronting side surfaces of flapper 15a. As is the case with the embodiment already described, the apparatus includes a pair of outlet orifices 39 and 40, each of which is associated with a conduit leading toward an actuator (not illustrated) which may be of the kind described above with regard to FIG. 1. For purposes of illustration, the right-hand conduit has been identified as 41, and the left-hand conduit as 42. Each of these conduits is provided with a passage which extends toward and terminates in one of the collars 37a or 38a. For example, the outlet leading toward conduit 41 is provided with a passage 43 which terminates at 44, in fluid tight association with collar 37a. In like manner the conduit 42 is provided with a passage which terminates at 45 in fluid tight association with collar 38a. While in ball-type pistons are shown in the interest of simplicity of illustration, it will be obvious that other pistons or more sophisticated design could be used. As will be clear from inspection of the drawing, these force-balancing pistons are pressurized from the actuating conduits 41 and 42 by the mentioned passage means.

Assuming that the head of the flapper is moved into operating position against the outlet port 40, as shown by force exerted at the solenoid 13a, it will be apparent that jet-derived fluid inletted into the cross passage 32 will flow from the flapper head through the outlet port 40 and the conduit 41 towards an associated actuator. By reason of connection of the take-off passage 43, into conduit 41, fluid at the same pressure will be directed through said passage and into the collar 37a, urging the ball-type piston 37 against the left side flapper 15a, as viewed in the figure. When this position is reached the valve is self-sustaining, since force from solenoid 13a is no longer required to maintain the flapper in the illustrated position. Energizing of the opposite solenoid will, of course, cause the flapper to pivot to a similar position opposite the position illustrated. In this latter position the pressure existing within the conduit 42 is exerted against piston 38 which, in turn, exerts force against the right side of the flapper, as illustrated in the figure and maintains said flapper against the left-hand exit port 39.

Figure 8:
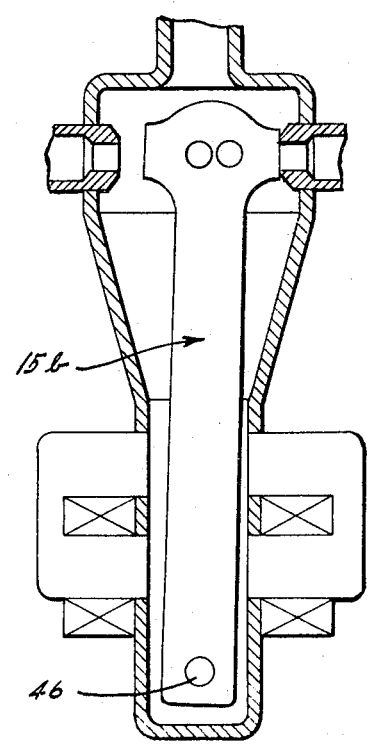
FIG. 8 is a view similar to FIG. 2 and illustrates modified flapper apparatus in which the flapper is pivoted in a different position.
Figure 9:
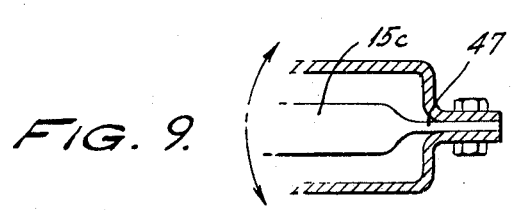
FIG. 9 illustrates an alternative flexible, cantilever, mounting for a flapper arm.

FIG. 8 illustrates an alternative embodiment in which the flapper 15b is pivoted near its lower end, at 46, rather than at an intermediate location as is the case with the embodiment shown at FIGS. 1 and 7. This form may be used where it is desired to minimize the inertia of the flapper, and to maximize the rate of response. FIG. 9 illustrates an alternative flexible mounting for the cantilevered moving flapper. In this embodiment, the flapper 15c has a reduced neck 47 which provides flexure mounting of the flapper. When so mounted, the mounting neck serves as a spring tending to center the flapper.

The invention contemplates the embodiments of FIGS. 7–9, and such other modifications as come within the scope of the appended claims.

I claim:

1. In a fluid pressure actuated control valve system: means defining a pair of outlet ports through which fluid may flow toward apparatus to be controlled; a valve member mounted with freedom for movements toward and away from said outlet ports and into position directly to confront said ports selectively; means defining a pair of opposed inlet nozzles through which jets of fluid may be supplied and flow toward spaced opposite portions of said valve member; and passage means formed in the valve member for delivering jet-derived fluid into one or the other of said outlet ports depending upon the position of said valve member with respect to said outlet ports.

2. A valve system in accordance with claim 1, and further including apparatus for controlling the position of said valve member with respect to said outlet ports.

3. A valve system in accordance with claim 2, and in which said apparatus for controlling the position of said valve member includes electromagnetic means.

4. A valve system in accordance with claim 3, and in which said apparatus for controlling the position of said valve member includes electromagnetic means and means responsive to fluid pressure at said outlet ports for subjecting the valve member to said pressure, whereby to exert force tending to hold said valve member in the position determined by said electromagnetic means.

5. A valve system in accordance with claim 1, and in which: said valve member comprises flapper means mounted with freedom for swinging movements of one end thereof in a plane transverse the path of fluid supplied by said opposed nozzles; said passage means includes a pair of parallel conduits each extending through said end in the direction of the path of fluid supplied by said opposed nozzles, and each selectively disposable between said opposed nozzles in position to receive fluid from both nozzles simultaneously, said passage means further including a pair of ducts each of which is in fluid flow communication with a corresponding one of said conduits and each of which leads through said end to an opening disposed to confront a corresponding one of said outlet ports.

6. A valve system in accordance with claim 5, in which said nozzles are adapted to supply fluid at supersonic velocity, and said parallel conduits each comprise jet diffuser means.

7. A valve system in accordance with claim 6, and further including pressure relief means comprising a bleed gap of predetermined width interposed between each said nozzle and the openings of said confronting conduits.

8. A pneumatic control valve comprising: means defining a cavity; means defining a pair of confronting nozzles for supplying fluid at supersonic velocity into said cavity and along a line of centers common to said nozzles; means defining a pair of oppositely disposed outlet ports through which fluid may flow from said cavity toward apparatus to be controlled; an elongated valve flapper swingably supported toward one end and having a free end disposed between said outlet ports and swingable therebetween to overlie one or the other of said ports, said free end comprising a jet coupler having a pair of individual fluid passages extending therethrough in the direction of said line of center, said passages being provided with spaced open ends, and said passages being selectively adapted to confront said pair of nozzles in accordance with the position of said flapper within said cavity, and a pair of other passages within said coupler, each in fluid flow communication with one of said passages first mentioned and each said other passage leading through said jet coupler to a position in which it confronts a corresponding one of said outlet ports.

9. A control valve in accordance with claim 8, and further characterized in that said nozzles are so relatively spaced from the conduits, when the latter confront the nozzles, as to establish sufficient bleed gap between the nozzles and conduits to prevent deleterious overpressure developing in any associated apparatus to be controlled.

10. A control valve in accordance with claim 9, and further including means providing exhaust portage from said cavity, the area of said portage being substantially greater than the sum of the areas of said pair of nozzles.

11. In a gas pressure actuated control valve system: means defining a pair of outlet ports through at least one of which gas may flow toward apparatus to be controlled; a valve member mounted with freedom for movements between two positions in which it controls flow through said outlet ports; inlet jet-forming nozzle means through which gas may flow toward said valve member; passage means in the valve member through which jet-derived gas flows toward one of said outlet ports when said valve member is in one of its two positions; and pressure relief means comprising a gas bleed gap interposed between said nozzle means and the passage means in said valve member, said bleed gap being of dimension to bleed off sufficient gas to prevent deleterious overpressure developing in any associated apparatus to be controlled.

12. A valve system in accordance with claim 11, and in which gas flows in the jet at supersonic velocity, bleed-off occuring in response to movement of a shock wave in counterflow to the direction of gas flow.

* * * * *